E. B. CANTRELL & G. E. MILLER.
OIL RETAINER.
APPLICATION FILED SEPT. 5, 1917.
1,291,397.
Patented Jan. 14, 1919.
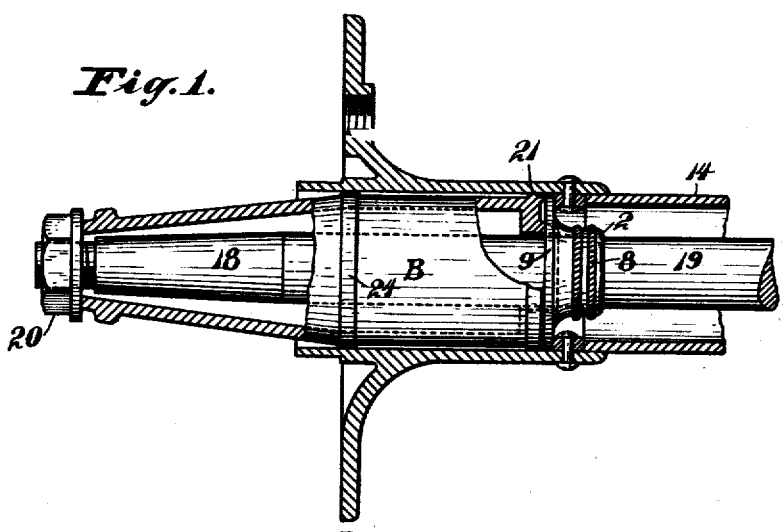
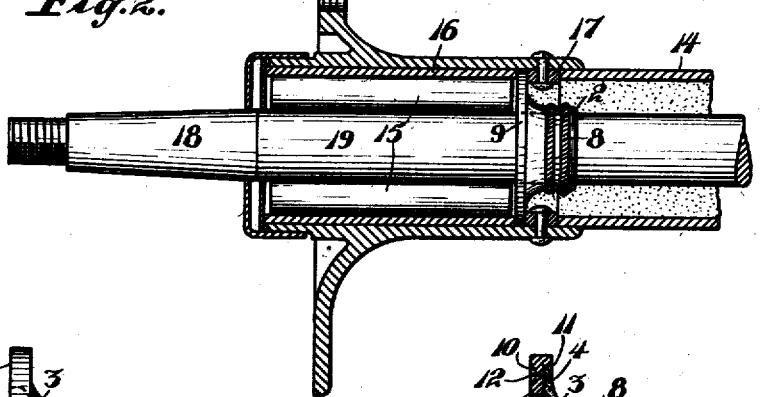
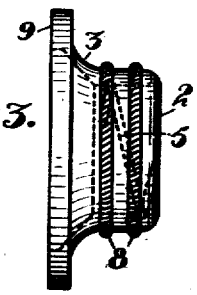
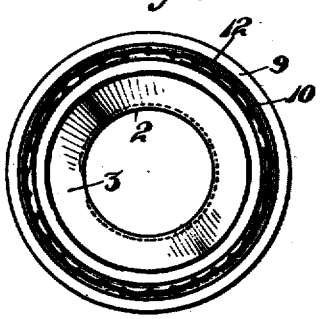
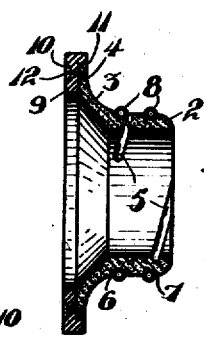
WITNESS:
INVENTORS:
Edwin B. Cantrell
George E. Miller
BY
Strong & Townsend
ATTORNEYS.

UNITED STATES PATENT OFFICE.

EDWIN B. CANTRELL AND GEORGE E. MILLER, OF SAN FRANCISCO, CALIFORNIA.

OIL-RETAINER.

1,291,397.

Specification of Letters Patent.  Patented Jan. 14, 1919.

Application filed September 5, 1917. Serial No. 189,788.

*To all whom it may concern:*

Be it known that we, EDWIN B. CANTRELL and GEORGE E. MILLER, citizens of the United States, residing at the city and county of San Francisco and State of California, have invented new and useful Improvements in Oil-Retainers, of which the following is a specification.

This invention relates to an oil retainer, and particularly to improvements on the oil retainer shown in our former Patent No. 1,057,656, issued April 1st, 1917.

One of the objects of the present invention is to provide a simple, cheaply manufactured, easily applied leather packing member to be used in connection with axle housings on automobiles, gear housings and bearings in general through which a shaft or axle extends and which are generally filled with a lubricant that has a tendency to leak or escape around the axle. Another object of the invention is to provide a novel form of expansible washer for securing the packing member in place and locking it against turning movement with relation to the shaft and housing in which it is inserted. Further objects will hereinafter appear.

The invention consists of the parts and the construction and combination of parts as hereinafter more fully described and claimed, having reference to the accompanying drawings, in which—

Figure 1 is a central, longitudinal section through an axle housing, showing a suitable form of tool for inserting the packing member and expanding the packing washer.

Fig. 2 is a similar view, showing the packing member and washer in place.

Fig. 3 is a side elevation of the oil retainer or packing member.

Fig. 4 is a central, vertical section through same.

Fig. 5 is an end view.

The oil retainer forming the subject-matter of the present application is constructed of a leather disk which is placed between two die members and pressed or shaped substantially as shown in Figs. 3, 4 and 5. The retainer consists of a sleeve portion 2, an annular conical section 3 and a circumferential flange 4.

Formed interiorly of the sleeve portion 2 is an inclined oil removing groove 5, and formed exteriorly of the sleeve are two annular grooves 6 and 7 which are provided for the reception of a pair of coil spring rings 8. Adapted to be attached to the flange 4 of the retainer is a lead washer 9. One face of this washer is provided with an annular, concaved recess 10, while the opposite face is provided with an annular shoulder 11 which forms an exterior seat for the reception of the flange 4 of the retainer. The retainer may be secured to the lead washer in any suitable manner, but preferably by perforating the washer and sewing the retainer thereto by thread, wire or other suitable material, as shown at 12. The annular recess 10 is sufficiently depressed to receive the thread 12, thereby keeping it out of contact with any exterior member which might have a tendency to contact or wear away the thread.

The present oil retainer is particularly constructed for use in connection with an axle housing 14, such as is employed on "Ford" and like automobiles, and when inserted or placed in position it assumes the position shown in Fig. 2. For the purpose of getting the best result when inserting the retainer here shown, it is first necessary to remove the roller bearing 15 and the bearing sleeve 16, together with all packing waste or obstructions that might be in the housing. All burs or rough edges should then be filed off of the axle in the vicinity of the retainer which may then be inserted endwise until it engages the end of the axle housing shown at 17.

A special form of tool, generally indicated at B, is then slipped over the spindle 18 and the axle 19, as shown in Fig. 1, and the nut 20 is screwed up against the end of the tool or washer placed in front of same. Tightening up of the screw forces the tool inwardly against the lead washer and as the forward face of the tool is provided with an annular projection, which is approximately V-shaped in cross section, as shown at 21, it can readily be seen that it will force the lead washer tightly up against the end of the axle housing and will also expand the washer radially or circumferentially to such an extent that it will be tightly locked within the bearing. The pressure of the tool against the washer will also force the annular shoulder 11 of the washer into any depression in the end of the axle housing and thus form a tight joint between the faces and also between the inner surface of the bearing and the outer surface of the washer.

The tool may then be removed and the bearing sleeve 16, together with the roller bearing 15, replaced; the replacing of the bearing sleeve being materially assisted by reversing the position of the tool B to permit the shoulder 24 to engage the end of the bearing sleeve when the nut 20 is applied. The bearing sleeve may, therefore, be forced into position by screw pressure and its inner end may be embedded in the face of the washer, thus further locking it against circumferential movement.

The axle housing 14 may in this instance be filled with a heavy oil in preference to a grease and no leakage will take place between the axle and the roller bearing as the spring rings 8, surrounding the sleeve portion of the retainer, will retain this so tight around the revolving shaft that leakage or escape of oil at this point is practically obviated, any leakage which might occur being positively prevented by providing the groove 5 which constantly wipes the shaft and returns any oil which might have a tendency to leak.

The retainer as a whole is simple and substantial in construction and can be easily applied wherever required and may always be locked and sealed in place by the lead washer provided. That is, the expansion of the gasket radially, when it is forced into place, produces a seal around the periphery of the retainer through which the oil cannot leak, and simultaneously locks it in place, as previously described.

While the retainer has here been described and shown as used in connection with an axle housing, it is obvious that many other applications or uses for a device of this character may be devised and that the various parts comprising the same may be such as the experience and judgment of the manufacturer may dictate.

Having thus described our invention, what we claim and desire to secure by Letters Patent is—

1. An oil retainer composed of a soft-metal washer having a circular depression on its front face and having a circular shoulder extending outwardly from its rear face, a fibrous sleeve-like member having one end flared and engaging the rear face of the washer and said shoulder so as to be held by the latter against movement radially of the washer, said washer having perforations extending through its rear face and through said depression, and means for securing the member to the washer extending through said perforations and lying within the depression so as to be protected by the latter.

2. An oil retainer composed of a metal washer having a circular shoulder extending outwardly from its rear face and spaced from the inner circumference of the washer, a fibrous sleeve-like member having one end flared and engaging the rear face of the washer and having its periphery engaging said shoulder, and means extending through the washer and said flared part of said member to secure the member to the washer.

3. In an oil retainer for axle housings, a soft metal washer having a shoulder extending outwardly from its rear face, a fibrous sleeve-like member having one end flared and engaging the rear face of the washer and said shoulder, and means to secure the member to the washer so as to enable the latter to be expanded by an extraneous force so as to expand the washer radially and to also expand the shoulder to form a close fit with the end of the axle housing and with the flared end of the member.

4. In an oil retainer for axle housings, a washer, a fibrous sleeve like member having one end flared and engaging the rear face of the washer, and means to secure the member to the washer whereby to allow force extraneous to said securing means to be applied to the front face of the washer so as to expand the washer radially and against the end of the axle housing to form a tight fit therewith.

In testimony whereof we have hereunto set our hands in the presence of two subscribing witnesses.

EDWIN B. CANTRELL.
GEORGE E. MILLER.

Witnesses:
JOHN H. HERRING,
W. W. HEALEY.